United States Patent
Nikou et al.

(10) Patent No.: US 10,307,855 B2
(45) Date of Patent: Jun. 4, 2019

(54) IMPENDING THERMAL SHUTDOWN ALERT SYSTEM AND THERMAL SHUTDOWN PROCESS

(71) Applicant: ILLINOIS TOOL WORKS INC., Glenview, IL (US)

(72) Inventors: Milad Pashapour Nikou, Appleton, WI (US); Craig Steven Knoener, Appleton, WI (US); Daniel James Helein, Sherwood, WI (US); Alan Manthe, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 368 days.

(21) Appl. No.: 15/083,936

(22) Filed: Mar. 29, 2016

(65) Prior Publication Data

US 2017/0282275 A1 Oct. 5, 2017

(51) Int. Cl.
| | |
|---|---|
| *B23K 9/10* | (2006.01) |
| *B23K 9/16* | (2006.01) |
| *H05H 1/34* | (2006.01) |
| *H05H 1/36* | (2006.01) |
| *B23K 37/00* | (2006.01) |
| *B23K 9/095* | (2006.01) |

(52) U.S. Cl.
CPC ......... *B23K 9/1043* (2013.01); *B23K 9/0953* (2013.01); *B23K 9/0956* (2013.01); *B23K 9/10* (2013.01); *B23K 9/1012* (2013.01); *B23K 9/1062* (2013.01); *B23K 9/16* (2013.01); *B23K 37/003* (2013.01); *H05H 1/36* (2013.01); *H05H 2001/3473* (2013.01)

(58) Field of Classification Search
CPC ...... B23K 9/10; B23K 9/1043; B23K 9/1012; B23K 9/1062; B23K 9/0953
USPC ......... 219/130.1, 130.21, 133, 137.7, 137.71
See application file for complete search history.

(56) References Cited

U.S. PATENT DOCUMENTS

| | | | |
|---|---|---|---|
| 5,760,563 A * | 6/1998 | Bennett ................ | G11B 19/247 318/471 |
| 6,093,905 A | 7/2000 | Hardwick et al. | |
| 6,242,711 B1 * | 6/2001 | Cooper ................... | A61F 9/06 219/130.01 |
| 8,642,924 B2 | 2/2014 | Knoener | |
| 2006/0118534 A1 * | 6/2006 | Casner ................ | B23K 9/1062 219/130.21 |
| 2006/0207979 A1 * | 9/2006 | Daniel ................... | B23K 9/095 219/130.01 |

OTHER PUBLICATIONS

European Search Report for Appln. No. 17153313.6-1551 dated May 9, 2017 (9 pages).

* cited by examiner

*Primary Examiner* — Thien S Tran
(74) *Attorney, Agent, or Firm* — McAndrews, Held & Malloy, Ltd.

(57) ABSTRACT

A welding-type system with a programmed controller and alert devices for alerting a user as to the impending thermal shutdown of the welding-type system.

19 Claims, 6 Drawing Sheets

IMPENDING THERMAL SHUTDOWN ALERT SYSTEM AND THERMAL SHUTDOWN PROCESS

BACKGROUND

Welding, cladding and plasma cutting systems, and engine (generator) systems therefor, typically include safeguard systems for preventing overheating. Such systems typically shut down the system when a circuit, component, or device reaches or exceeds a first threshold temperature, and keeps the system in a shut down mode until the temperature falls to or below a second threshold temperature. For example, a power transformer will include a suitable temperature sensor (e.g., a thermister) that cuts off the power when the transformer exceeds a threshold temperature. Then, after the transformer has cooled, the power connection is resumed.

Often, if not typically, the welding, cladding, and plasma cutting systems are utilized to their fullest capacities, and this means that they are driven into overheating or over-temperature conditions, with resultant numerous shutdowns. The immediate shutdowns can occur before a weld, clad or cut is completed resulting in, among other things, piecework welds, and loss of time.

SUMMARY

The present disclosure provides one or more inventions in which impending thermal shutdown of A welding-type system is alerted. Examples of such a system include welding systems, cladding systems, plasma cutting systems, induction heating systems, and electrical generators therefor. The present disclosure also provides an invention relating to a process for thermal shutdown of such a system.

As used herein, the term "welding-type system" refers generically to a welding system, a cladding system, a plasma cutting system, an induction heating system and/or an engine for any of the foregoing.

An impending thermal shutdown alert enables an operator to be aware of an impending over-temperature situation that can lead to shutdown and also provides time to take appropriate actions. For example, in a welding system, the action might be to end a welding operation at a better stopping spot. Further, an operator can worry less about tracking welding time to estimate an impending shutdown. Further, the system itself can take other actions in anticipation of the shutdown such as storage of operating data and parameters. In systems with wire feeders, the feeding of wire can be stopped early to avoid continued feeding of the wire and the resulting sticking of the wire to a weld spot.

In an embodiment, a welding-type system includes an instant temperature determination unit, a data processor, memory (in the form of a non-transitory computer readable storage medium) storing an over-temperature value and an impending thermal shutdown temperature value or an impending thermal shutdown temperature offset value, and an impending thermal shutdown alert signal generator. When an electrical circuit, component or device is determined to have reached an impending shut down temperature, i.e., when the data processor determines that an instant temperature determined by the instant temperature determination unit is equal to or greater than the impending over-temperature set point or an offset of the over temperature set point, the data processor causes the impending shut down alert signal generator to generate an alert signal.

In an embodiment, the welding-type system is a welding system, a cladding system, a plasma cutting system, or an electrical generator.

In an embodiment, the alert signal is a modulated signal.
In an embodiment, the alert signal is an analog signal.
In an embodiment, the alert signal is a digital signal.
In an embodiment, the welding-type system includes one or more alerts driven by the alert signal, the alerts including one or more of a motor, a light, an audible alert, and a vibration unit.

In an embodiment, the welding-type system includes two or more alert signal generators.

In an embodiment, the welding-type system includes two or more alerts driven by the two or more alert signal generators, respectively, the alerts including one or more of a motor, a light, an audible alert, and a vibration unit.

In an embodiment, the memory includes a shutdown routine that is invoked by the data processor when the electrical circuit, component, or device, reaches the impending over-temperature temperature.

In an embodiment, the welding-type system is a welding system.

In an embodiment, the welding-type system is a cladding system.

In an embodiment, the welding-type systems is an electrical generator.

In an embodiment, the temperature determination unit includes a thermister, a thermostat, or a unit that calculates operating time.

The alert can be in any suitable form, including an audio, visual or haptic cues.

One suitable cue is in the form of alteration of a motor speed, fan speed or fan pitch to generate an audible cue.

Another suitable cue is in the form of a audible alert, e.g., one or more emission of a sound.

Another suitable cue is in the form of a visual alert such as a flashing light.

Another suitable cue is in the form of a vibration in the torch.

In an embodiment disclosed herein, a controller board for a welding-type system apparatus includes a processor is programmed monitor for an over temperature condition and triggering of the an operation of the apparatus, and to invoke a thermal shut down routine when the over temperature condition occurs.

In an embodiment, the processor is programmed to maintain the apparatus in a stand by mode until triggered to operate by a user.

In an embodiment, the processor is programmed to prevent operation of the apparatus until the over temperature condition is cleared.

These and other aspects of the disclosure are discussed in greater detail below with reference to the drawings.

DETAILED DESCRIPTION

Figure 1:
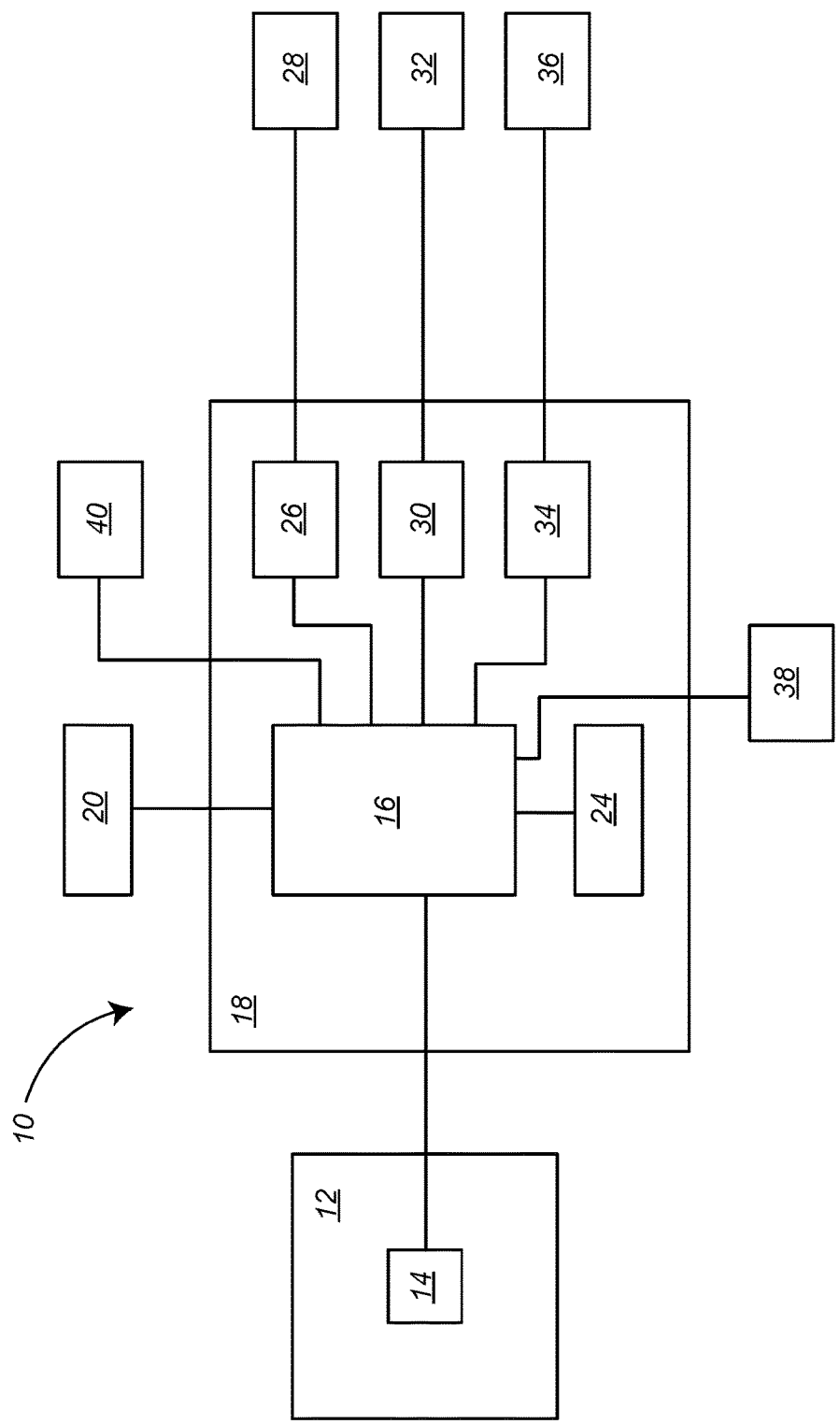
FIG. 1 schematically illustrates A welding-type system embodying principles of the present disclosure.

Various embodiments and aspects thereof will be described with reference to details discussed below, and the accompanying drawings will illustrate the various embodiments. The following description and drawings are illustrative and are not to be construed as limiting. Numerous specific details are described to provide a thorough understanding of the various embodiments. However, in certain instances, well-known or conventional details are not described in order to provide a concise discussion of the embodiments.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

In FIG. 1, there is illustrated in block schematic form a welding-type system 10 embodying principles disclosed herein. As illustrated, the system 10 includes an electrical circuit, component or device 12 that can overheat beyond a predetermined temperature when driven or operated too long or too hard. As an example, a welding power source can be driven to an overheated condition due to prolonged use, given the continuous generation of high amperage power to the welding torch.

Such circuits, components, or devices 12 can be controlled by a control circuit and typically are protected from damage due to the overheating by suitable cutoff or shut down mechanisms using thermal fuses or switches. The fuses or switches blow or trip, respectively, when too high of a temperature condition exists, and break or interrupt an electrical circuit.

Thermal fuses are sacrificial devices in that they have a one time use and once blown, must be replaced. Thermal switches are reusable devices, typically, and therefore suited to protecting against temporary situations which are common and user-correctable. Thermal switches are used in power supplies in case of overload, and also as thermostats in some heating and cooling systems.

Thermal switches are reset either manually or automatically. Manually resetting thermal switches typically are used in situations where an automatic and unattended restart could create a hazardous condition, such as sudden startup of a powerful motor without warning.

While thermal switches typically are normally closed switches that open when tripped, a positive temperature coefficient (PTC) thermistor are devices that have a "switch" temperature at which their resistance suddenly rises rapidly, thereby limiting the current through the circuit. When used in conjunction with a thermistor relay, the PTC thermistor can switch off an electrical system at a desired temperature. Typical use of a thermistor is for motor overheat protection.

Negative temperature coefficient (NTC) thermistors are made from a pressed disc, rod, plate, bead or cast chip of semiconducting material such as sintered metal oxides. They work because raising the temperature of a semiconductor increases the number of active charge carriers—it promotes them into the conduction band. The more charge carriers that are available, the more current a material can conduct.

Thermocouples use the principle of two different conductors forming electrical junctions at differing temperatures. A thermocouple produces a temperature-dependent voltage as a result of the thermoelectric effect, and this voltage can be interpreted to measure temperature.

As shown in FIG. 1, the circuit, component, or device 12 includes a temperature measuring circuit 14 that can include a thermostat, thermocouple, or thermistor to measure the instant temperature of the circuit, component, or device 12. The circuit 14 generates an instant temperature value that is then sent to a processor 16 on a controller board 18.

Controller boards which can be modified to be the controller board 18 are provided in many of new welding, cladding and plasma cutting products produced by Miller Electric Mfg., Co. One such controller board is provided in the Millermatic® 211 metal-inert-gas (MIG) welding machine. The Miller Electric part no. for one such controller board is PCBA 242625.

The processor 16, is programmed to compare the instant temperature value with a predetermined temperature value stored in a suitable memory 24. The memory is a non-transitory computer readable storage medium. For determining whether the instant temperature has reached the thermal shutdown temperature, such controller boards include a factory preset thermal shutdown temperature value. However, many times, such controller boards 18 also allow an end user to supply an alternate lower shutdown temperature value via a suitable user interface. End users might prefer a lower shutdown temperature value to ensure a less heating of the circuit, component, or device to thereby prolong its life. A user input section device 26, e.g. a keypad, is provided for this purpose.

In accordance with the principles disclosed herein, in addition to the factory preset and, if any, user set thermal shutdown temperature value, the memory 24 includes one or more predetermined impending thermal shutdown temperature values. Preferably, one predetermined impending thermal shutdown temperature value is factory preset. Preferably, another predetermined impending thermal shutdown temperature value is set by the end user. An impending thermal shutdown temperature can be, e.g., an absolute temperature value or an offset value, i.e., a delta value to subtract from either the factory preset thermal shutdown temperature value or, if present, the factory preset impending thermal shutdown value.

As can be appreciated, in the prior art, when the instant temperature of the electrical circuit, component, or device reached the factory preset thermal shutdown temperature or the user input thermal shutdown temperature, the processor 16 would initiate an immediate shut down of the operation of the electrical circuit, component, or device to prevent over temperature damage to same. Welding operations were subject to an immediate shutdown and welds left in an undesirable uncompleted state.

To avoid this, currently, many welders keep track of elapsed operation time to estimate when a shutdown will occur to avoid such a situation.

In accordance with principles disclosed herein, the processor 16 is programmed with logical instructions, whether by software, firmware or hardware, to identify when the instant temperature of the electrical circuit, component or device reaches the factory preset or user set impending thermal shutdown temperature value or is within a predetermined range or offset from a preset thermal shutdown temperature or a present thermal shutdown temperature value.

Further, when the processor 16 determines that the preset or user set impending shutdown temperature has been reached, it sends an impending shutdown signal to an alert signal generator 26, which in turn generates a impending shutdown alert signal used by an alert unit 28.

In one embodiment, the alert signal generator 26 is a pulse width modulated (PWM) motor controller that controls an alternating current (AC) motor (e.g., a generator or a fan motor) which serves as the alert unit 28. The motor could even be the device 12.

It is to be noted, that although pulse width modulation is used in this example, other analog or digital modulation schemes might be used. Examples include, frequency modulation, amplitude modulation, single side band modulation, double side band modulation, vestigial side band modulation, quadrature modulation, angle modulation, phase modulation, transpositional modulation, phase shift key modulation, frequency shift key modulation and amplitude shift key modulation to name a few.

When the motor controller 26 receives the impending shutdown signal from the processor 16, it maintains a constant voltage for the motor but selects a frequency for the AC power supplied to the motor 28. The selected frequency is such that an audible difference can be heard by the operator or user of the electrical circuit, component, or device 12. For example, it has been determined that a 100 kHz power signal supplied to an arc welder generator will produce a sufficient audible signal at the welding arc to provide a warning that the impending shutdown temperature has been reached. Such a motor controller is currently provided on the above mentioned Miller Electric controller boards, although they are not used to vary the frequency of the PWM signal to produce an audible noise, as contemplated by the principles disclosed herein.

The same principles can apply if the alert is a welding stick itself. In that regard, the frequency of the electrical power provided to welding stick can be varied to produce an audible signal in the arc. Again, a PWM controller can be used to vary the frequency of the current, while maintaining the voltage of the power signal.

Alternatively, or additionally, the controller board 18 can include another alert signal generator 30 that generates an alert signal for a visual alert 32 such as an light emitting diode or a lamp. As can be appreciated, the alert signal for the alert 32 can be of any suitable type so as to produce a constant or varying emission of light (such as flashing light).

Alternatively, or additionally, the controller board 18 can include another alert signal generator 34 that generates an alert signal for a vibration alert 36, such as a piezo-electric vibrator. Such a vibrator can be positioned on or incorporated into a hand-held welding or cutting torch and alert as user of the impending shutdown by causing perceivable vibration in the torch.

All such alerts are readily available as are the alert signal generator units.

Note that in some instances it may be desirable to power an alert directly by the processor. For example, some low power alerts, such as light emitting diode 38 can be directly connected to an output data line of a processor. Thus, the impending thermal shutdown alert signal can be generated by the processor 16.

Figure 2:
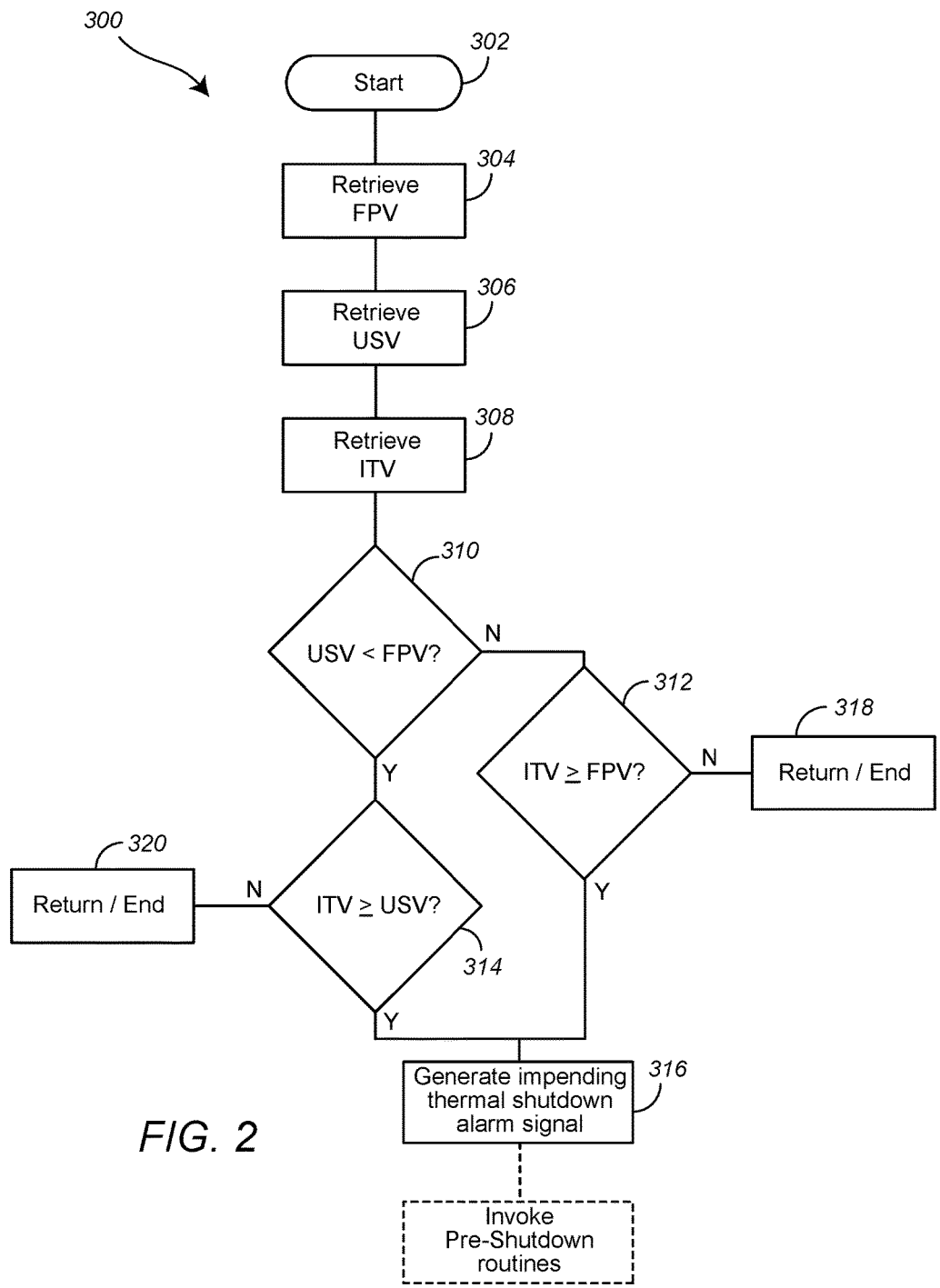
FIG. 2 illustrates a first routine via which an impending thermal shutdown condition can be determined.
Figure 3:
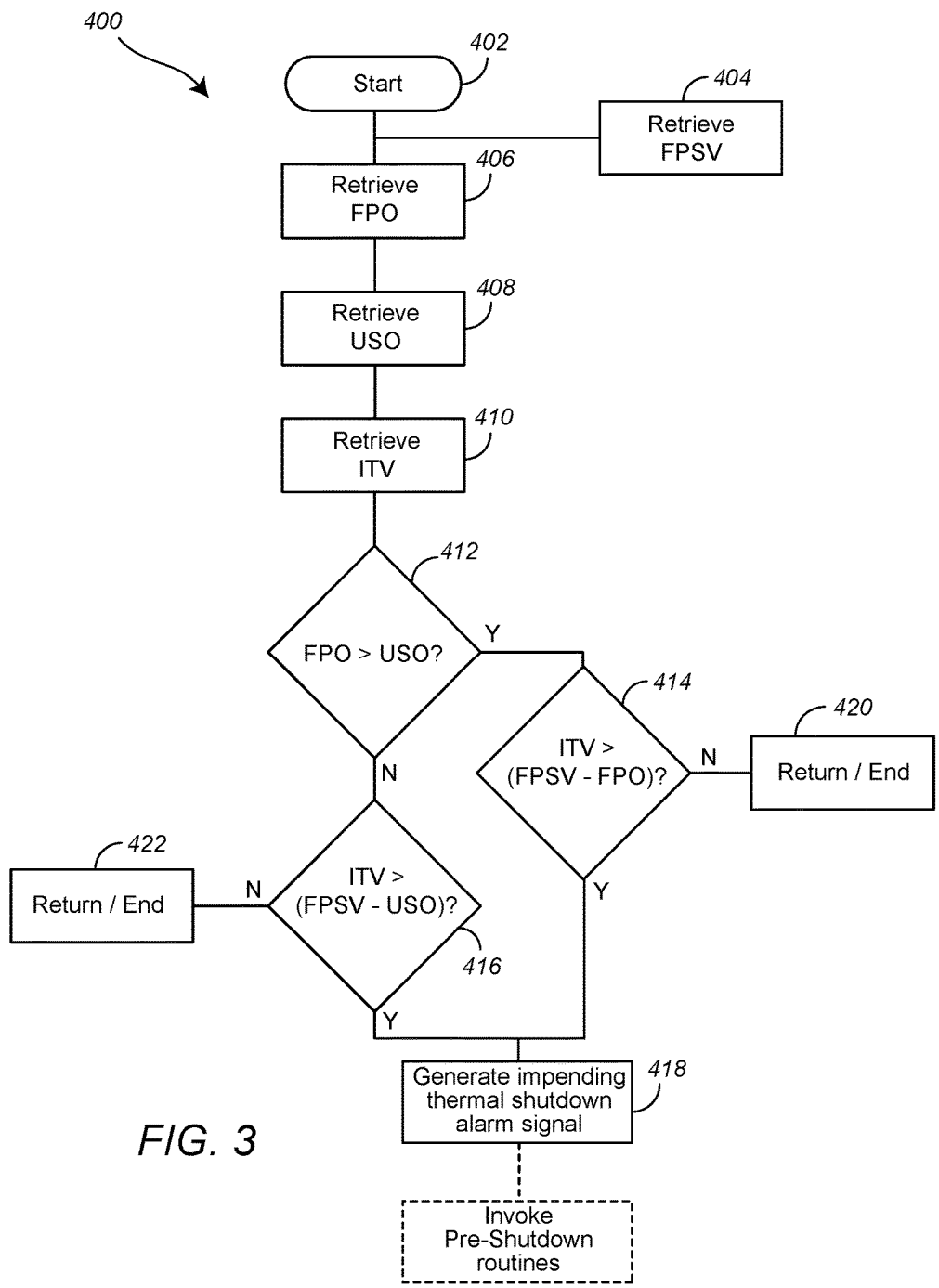
FIG. 3 illustrates a second routine via which an impending thermal shutdown condition can be determined.

In FIGS. 2 and 3, there are illustrated first routine 300 and a second routine 400 via which the processor 16 can determine whether the impending thermal shutdown temperature has been reached. Note, although the routines are indicated as a stand alone routines, either could simply be additional coding to in some other program invoked by the processor 16.

As illustrated in FIG. 2, the first routine 300 commences at step 302, when it is invoked as a subroutine or as part of other executing code, e.g., the code for determining whether the thermal shutdown temperature has been reached. Thereafter, in steps 304, 306, and 308, the processor retries the factory preset impending thermal shutdown temperature value FPV, the user set impending thermal shutdown temperature value USV, and the instant temperature value ITV, respectively, though not necessarily in that order.

In step 310, the user set impending thermal shutdown temperature value USV is compared to the factory set impending thermal shutdown temperature value FPV to determine which is the lower value. If FPV is equal to or greater than USV, the routine proceeds to step 312. Otherwise, the routine proceeds to step 314.

In step 312, a determination is made as to whether the instant temperature value ITV is greater than or equal to FPV. If yes, then the impending thermal shutdown temperature has been reached and the routine proceeds to step 316 where the processor 16 generates the impending thermal shutdown signal. Otherwise, the routine proceeds to step 318 and either returns to the running program, or ends, depending on how the routine is implemented.

Alternatively, in step 314, a determination is made as to whether the instant temperature value ITV is greater than or equal to USV. If yes, then the impending thermal shutdown temperature has been reached and the routine proceeds to step 316 where the processor 16 generates the impending thermal shutdown signal. Otherwise, the routine proceeds to step 320 and either returns to the running program, or ends, depending on how the routine is implemented.

As illustrated in FIG. 3, the second routine 400 commences at step 402, when it is invoked as a subroutine or as part of other executing code, e.g., the code for determining whether the thermal shutdown temperature has been reached. Thereafter, in steps 404, 406, 408 and 410, the processor retries the factory preset thermal shutdown temperature value FPSV, the factory preset impending thermal shutdown temperature value offset, FPO, the user set impending thermal shutdown temperature value offset USO, and the instant temperature value ITV, respectively, though not necessarily in that order.

In step 412, the user set impending thermal shutdown temperature value offset USO is compared to the factory set impending thermal shutdown temperature value offset FPO to determine which is the lower value. If FPO is greater than USO, the routine proceeds to step 414. Otherwise, the routine proceeds to step 416.

In step 414, a determination is made as to whether the instant temperature value ITV is greater than or equal to (FPSV-FPO). If yes, then the impending thermal shutdown temperature has been reached and the routine proceeds to step 418 where the processor 16 generates the impending thermal shutdown signal. Otherwise, the routine proceeds to step 420 and either returns to the running program, or ends, depending on how the routine is implemented.

Alternatively, in step 416, a determination is made as to whether the instant temperature value ITV is greater than or equal to (FPSV-USO). If yes, then the impending thermal shutdown temperature has been reached and the routine proceeds to step 420 where the processor 16 generates the impending thermal shutdown signal. Otherwise, the routine proceeds to step 422 and either returns to the running program, or ends, depending on how the routine is implemented.

Indubitably, there are many different routines that would accomplish the same effect, namely the comparison of the instant temperature with an impending thermal shutdown temperature, and the invocation of a step to cause an alert condition to exist. Further, in addition or in conjunction with either step 316 or 418, the processor could invoke a routine or steps in which the system prepares for shutdown. For example, operating data and/or parameters can be saved, some system devices can be operated differently to avoid harsh shutdown, etc.

Many welding helmets, such as the Titanium Series™, the Digital Infinity™ Series, Digital Elite™ Series and Digital Performance™ Series of helmets from Miller Electric, now include digital controls including digital displays, such as LCD displays, and alerts. These alerts also can be activated or the screens can be activated to alert the wearer as to impending shutdown. In one embodiment, an alert signal generator can be in communication with a wireless or radio communications device, as one example, a BlueTooth® transmitter or transceiver. The helmet can include a compatible wireless or radio communications device such, as one example a BlueTooth® receiver or transceiver in communication with the helmet processor. The helmet processor can easily be programmed via suitable logic, such as software, hardware, or firmware, to react to receipt of the alert signal and present an alert in the form of a sound, light or vibration to the wearer via the alerts or screens or an vibration device.

Figure 4:
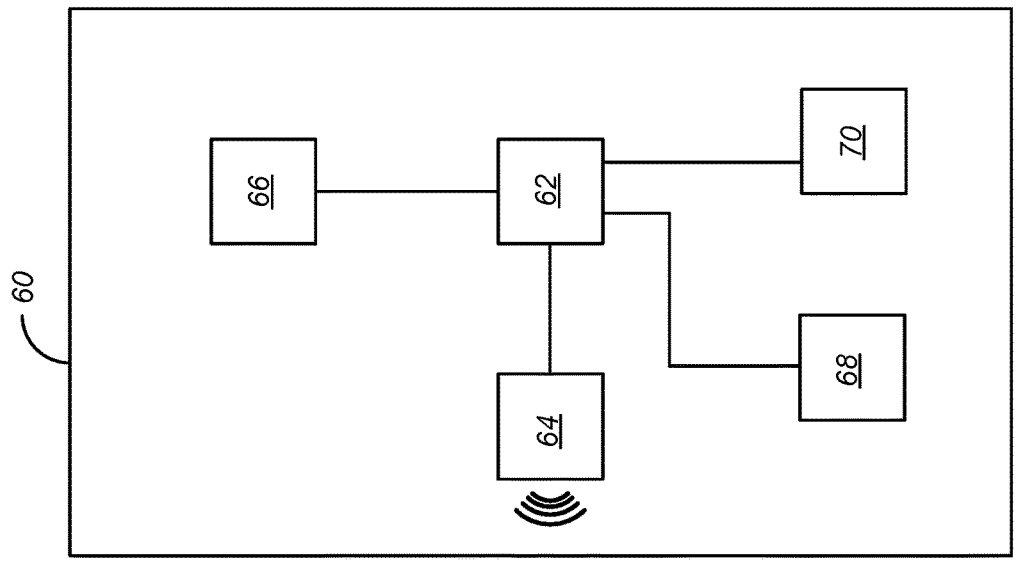
FIG. 4 illustrates interaction between a controller board and a welding/plasma cutting helmet in accordance with principles of the disclosure.
Figure 4:
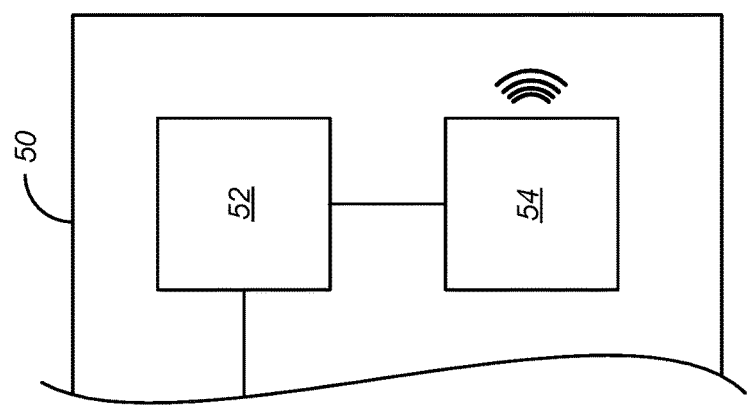

In that regard, in FIG. 4 there is illustrated a portion of a controller board 50 that includes an alert signal generator 52 and a radio communications device 52. The communications device 52 can include a radio signal transmitter or transceiver, depending on how much interactivity with a helmet is desired or needed. The controller board 50 is similar to the board 18, but is only partially illustrated for ease of reference.

As also illustrated, as mentioned above, a helmet 60 can include a controller 62 in communication with a radio communications device 64. The communications device 64 can include a radio signal receiver or transceiver, depending on how much interactivity with the controller board 50 is desired or needed. As can be appreciated, it is preferable that the communications devices 54 and 64 are paired in any of the known ways so that signals broadcast from the either communications device are not mistakenly interpreted by another communications device as applicable to that other communications device. Absent such concern for cross talk among nearby systems, the communications device 52 can simply broadcast the impending thermal shutdown alert signal, and the signal can be received by the device 64 without pairing of them or other mutual communications between them.

In FIG. 4, the helmet controller 62 is shown connected to three alerts, but the number of alerts is only illustrative. The number of alerts can be as few as one, or as many as desired or needed. For illustrative purposes only, the controller 62 is connected to a visual alert 66 (for example, an LED), an audible alert 68 (for example, a buzzer) and a vibrating alert 70 (e.g., a piezo electric vibrator).

As can be appreciated, when an impending over temperature or shutdown condition exists, the alert signal generator 52 will be caused to generate an alert signal that then is relayed to the communications device 54 which then transmits the signal in the form of a radio signal to the communications device 64 which then relays the alert signal to the controller 62. The controller 62 then sends an appropriate respective alert signal to each of the alert devices.

Although not illustrated here, some helmets are provided with liquid crystal windows or displays, through which or via which the welder or cutter views the welding or cutting operation. In accordance with the principles herein, upon receipt of the impending over temperature condition, the controller 62 can control such an LCD window or display to provide a visual effect such as rending the window more opaque or the display darker to thereby alert the wearer of the situation.

To summarize, the various alerts and indicators that can be activated to provide notice of an impending thermal shutdown, include, an audible alert such as a buzzer or siren, a variation in the driving of a motor, a variation in a speed or other driving of a fan, an audibly perceptible change in a welding or plasma arc, a visual indicator such as a light or other display of information, and a vibration of a gun, torch or helmet. all of these can be implemented using off-the-self devices. It is only necessary for the processor to invoke a routine when the impending over temperature condition is reached.

And again, all of the alerts are readily available off-the-shelf devices.

With reference again to FIG. 1, there can also be provided an indicator 40 driven by the data processor 16. In accordance with other principles disclosed herein, the indicator can be configured to provide a visual indication of the instant temperature measured by the sensor 14, as well as an indication of an impending thermal shutdown temperature. A bar gauge with different colored bars that light up in succession as the temperature increases is one such indicator. For example, such a bar gauge can have green bars for lower temperatures, yellow bars for intermediate temperatures and red bars for near thermal shutdown temperatures. A numeric readout of the instant temperature that changes colors in relation to the increases in displayed temperature is another such indicator. For example, as the displayed temperature increases, the lighter numerals or a background can change from green to yellow to red. Yet further, a simple representation of a mercury thermometer with the thermal shutdown temperature indicated is another shut indicator. Such indicators are easily implemented and parts available from parts suppliers.

In accordance with further principles disclosed herein, a system can be operated such that an end subroutine can be invoked with an over temperature condition arises. For example, while making a weld in a gas metal arc welding (GMAW) operation, the operator signals the welding power source to terminate the weld. This is typically done by releasing the welding gun trigger, but there are a number of other means, e.g., the trigger may have a hold/tap to release feature and the operator might tap the release, there might be a timer from a spot weld feature, or there might be an external signal from an automated system using a controller. At the end of a GMAW weld, the welding power source needs to stop weld current, stop wire advancement and stop flow of shielding gas.

In accordance with a typical end routine, the wire advancement is stopped first. The motor doesn't stop instantaneously, but takes a small amount of time to slow to a complete stop. To prevent the welding wire from freezing in the weld puddle, the output of the welding power source is left on a small time after the motor stops to burn the wire back towards (but not all the way to) the contact tip in the welding gun. The is the burnback time. During burnback, traditionally the output is maintained at the same voltage/current as the weld, or it may be ramped down as described in U.S. Pat. No. 8,642,924.

The shielding gas might stop when burn-back ends, or it might remain on longer to make sure there is enough time for the shielding gas to protect the weld as the puddle solidifies. This added time is called postflow.

Figure 5:
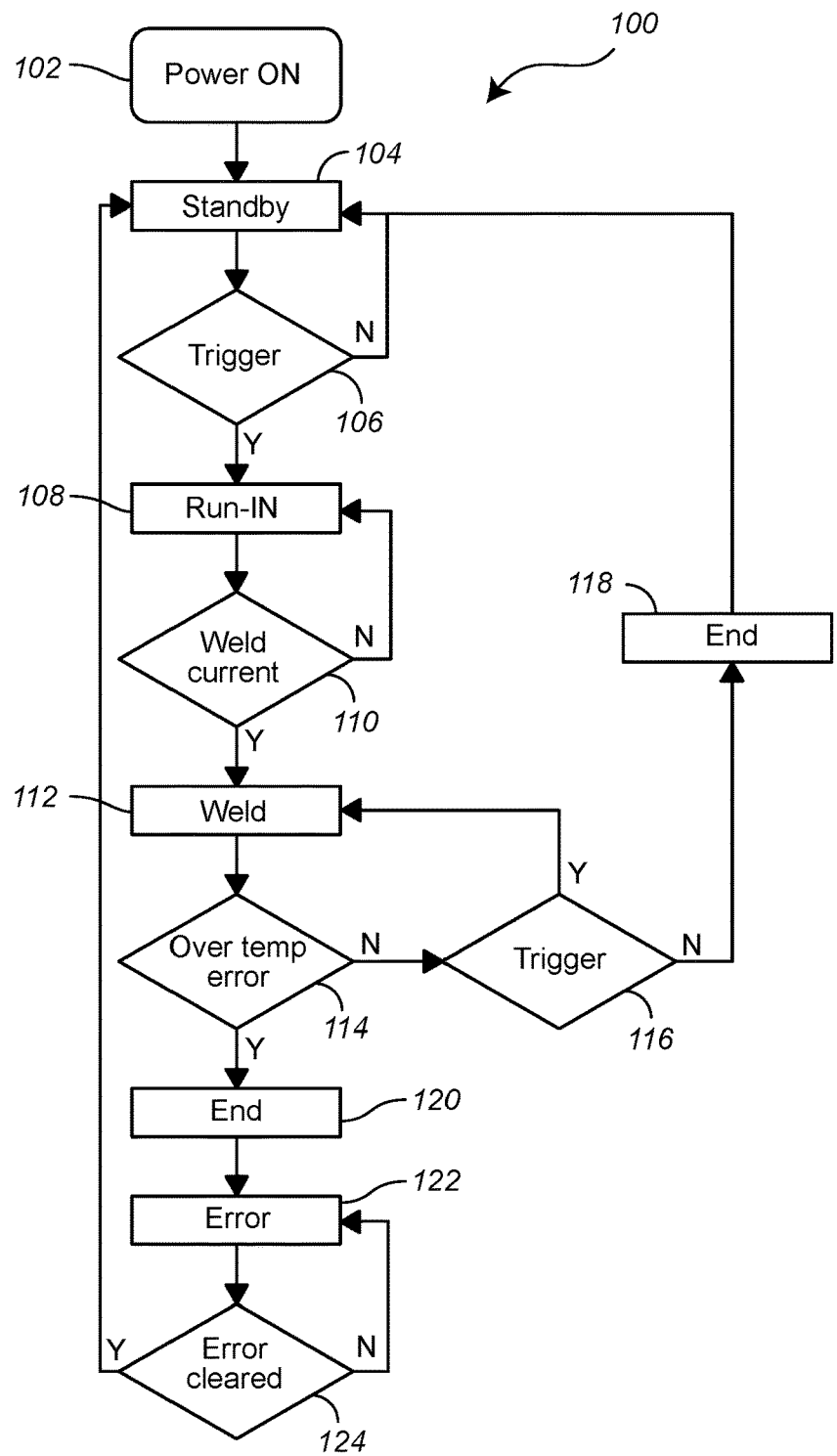
FIG. 5 illustrates a shut down routine that can be employed in a welding system.

In FIG. 5, there is illustrated a routine 100 undertaken by the processor 16 to accommodate thermal shutdown in a welding system, e.g., a gas metal arc welding (GMAW) system, a gas tungsten arc welding (GTAW) system, or a flux core arc welding (FCAW) system.

As illustrated, when the system, including the controller board, is powered on, at step 102 the processor 16 invokes a power on subroutine. The particulars of the power on subroutine are not of consequence to this description, but may include various subroutines to power up components and devices in the system. Some devices or components may have need for warm up periods.

Thereafter, at step 104, the processor 16 invokes a standby mode where the device being controlled, such as a welding system power source, is allowed to operate but awaits triggering for full operation. Thereafter, at decision point 106, the processor 16 checks for the occurrence of a trigger signal. The trigger signal is generated with a user or operator depresses the trigger on a welding gun. The trigger indicates with whether a user wants to commence or continue welding.

If a trigger signal has not occurred, the processor returns to standby mode at step 104. If a trigger signal has occurred, the routine proceeds to a step 108 and executes various subroutines in a Run-In mode. In the Run-In mode, feeding of feed wire and flow of shielding gas is commenced, although welding current is not provided to the welding gun.

Following step 108, at decision point 110 the processor 16 determines whether weld current is being provided by the power source. If yes, then the routine proceeds to step 112 where welding takes place until an over temperature situation occurs or the user or operator terminates the welding operation by discontinuing the generation of the trigger signal. In that regard, the routine queries at decision point 114 as to whether an over temperature situation has been determined.

If an over temperature situation is not indicated, at step 116, the processor 16 again checks for the occurrence of a trigger signal, i.e., whether the user or operator is still commanding the system to provide welding current. If the answer is yes, the processor returns to step 110. If the answer is no, at step 118, the processor 16 proceeds to step 118 and executes end routines that shut down the welding systems. Once the end routines have been executed, the processor returns to standby mode at step 104.

If an over temperature situation is determined at decision point 114, the routine 100 proceeds to step 120, where the end routines are invoked. However, instead of returning to the standby mode at step 104, at step 122, the processor 16 prevents further operation of the welding system and enters into an error mode until the over temperature condition has been cleared, i.e., the processor invokes an error routine. This routine can include involve causing one or more alerts to indicate the existence of the error condition and provide information relating to the condition.

At decision point 124, the processor determines if the over temperature condition has been cleared. If the over temperature condition has not been cleared, the routine loops back to the error state at step 122. Otherwise, if the over temperature condition has cleared, either manually or by some other means, the processor again invokes the standby mode and returns to step 104.

Figure 6:
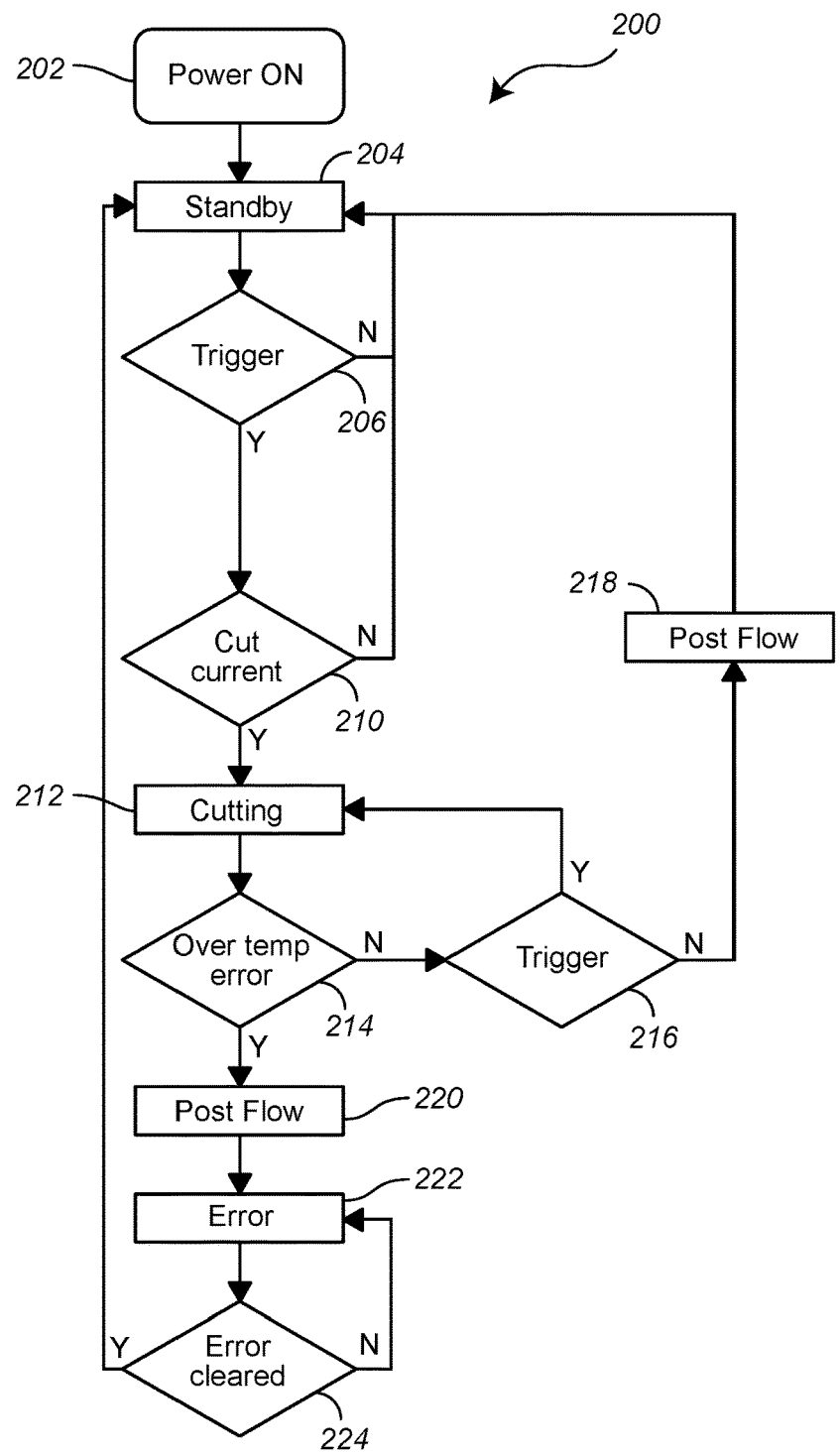
FIG. 6 illustrates a shut down routine that can be employed in a plasma cutting system.

In FIG. 6, there is illustrated a similar routine 200 suitable for a plasma arc cutting system.

Similar to the routine 100, the routine 200 commences at a step 202 with a power on mode. Thereafter, at step 204, the processor invokes a standby mode where the cutting system is operational, but awaits a command from a user operator to enter into full operational mode.

At decision point 206, the processor determines whether the system has been triggered to be in operation by a user operator. Again, this is indicated by a trigger signal resulting from the depression of trigger on a plasma cutting torch. If no such triggering has occurred, i.e., that there is no trigger or other indication received by the processor, then the routine stays in standby mode at step 204. However, if the system has been triggered to be in operation, at decision point 210, the processor determines whether sufficient cutting current is being supplied by the power source. If yes, the routine invokes cutting or operational mode at step 212. If no, the routine returns to standby mode at step 204. Note, there is no equivalent to a run-in mode as there is no no need for feed wire or shield gas in plasma cutting operations At step 212, plasma cutting is permitted and the system operates in plasma cutting mode until an over temperature condition arises or the user or operator discontinues a cutting operation. In that regard, following entry of step 212, at decision point 214, the determines whether an over temperature condition exists. If no, then at decision point 216 the processor determines whether the user or operator is still triggering the system to operate. If yes, the processor maintains the system in cutting or operation mode and returns to step 212. However, if there is no trigger, the at step 218 the processor invokes a post plasma cutting post flow subroutine, which is a routine via which the system is shutdown from its operational mode and gas flow is provided to the torch for cooling purposes. Thereafter, the processor returns to the standby mode at step 204.

If at decision point 214 it is determined that an over temperature condition exists, the routine proceeds to step 220 and invokes the post flow subroutine(s). Thereafter, at step 222, the processor invokes an error mode in which an error routine is invoked. This routine can include involve causing one or more alerts to indicate the existence of the error condition and provide information relating to the condition.

At decision point 224 the processor determines whether the over temperature condition has been cleared, i.e. whether the "error" has been cleared. If not, the processor continues to effect the error mode 222. If the error has been cleared, the processor effects the standby mode and returns the system to step 204.

In the foregoing descriptions of the routines 100 and 200, it is to be understood that although the word "mode" is employed, the word "state" is equally applicable.

Further, it is to be understood, that in the various modes or states, the processor may invoke one or more routines associated with those modes or states, the particulars of which are not pertinent to the disclosure herein because they are known. However, they are not invoked in a process or routine as described. In that regard, an important aspect of this disclosure is the invocation of and end routine or a post flow routine following determination of an over temperature error condition and the need to clear the over temperature condition before the system will again effect the standby mode or state.

It is further to be understood that in the error mode or state 122 or 222, the processor can invoke various routines to cause one or more alerts or information imparting devices to signal the existence of the over temperature condition, and any relevant information desired, such as, e.g., an indication of the temperature of the device giving rise to the over temperature condition.

It is further to be understood, that the processor can effect the sending of signals to the other devices such as the helmet of a welder or plasma cutter, or a gun or torch of the welder or plasma cutter, as described above.

Yet further, the foregoing routines 100 and 200 can be independent of any impending shutdown or over temperature condition routine that the processor can invoke or execute. An independent impending shutdown or over temperature condition can be provided in the form of an interrupt routine, a routine that is invoked when a processor receives a interrupt signal on one of its interrupt terminals. When such an interrupt signal is received, the processor gives priority to the interrupt routine. Since an alert routine, such as those mentioned herein, are fairly simple to implement, the processing time to effect an alert is minimal and would not adversely affect normal operation of the control board.

In addition to the foregoing, as mentioned above, it is also possible to estimate the occurrence of a thermal shutdown condition using elapsed time of operation. The same, then is true for the occurrence of an impending thermal shutdown condition. Thus, instead of relying on a measured instant temperature, in the alternative, a processor can be programmed to provide an impending thermal shutdown alert signal upon elapse of a predetermined time, which time can be factory set or user set. All that is needed is for the processor to keep track of operation time which can easily be done by checking its own clock after commencement of operation of the electrical circuit, component or device of concern.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

The invention claimed is:

1. A welding-type system, comprising:
a welding device susceptible to an excessive temperature condition;
a temperature measuring circuit with a sensor to measure a temperature of the device and generate an instant temperature value;
storage in which is stored a factory preset shutdown temperature value and (a) a lower, factory preset pre-shutdown temperature value, or (b) a predetermined temperature offset value;
a user input selection device configured to receive at least one of a second pre-shutdown temperature value or a second temperature offset value;
a control circuit coupled to receive the instant temperature value from the temperature measuring circuit, the control circuit programmed to:
determine at least one of which of the factory preset pre-shutdown temperature value or the second pre-shutdown temperature value is lower, or which of the predetermined temperature offset value or the second temperature offset value is higher;
compare the instant temperature value with (a) the lower of the predetermined pre-shutdown temperature value and the second pre-shutdown temperature value or (b) the lower of the predetermined shutdown temperature value less the predetermined temperature offset value or the predetermined shutdown temperature value less the second temperature offset value;
generate an alert signal depending on a result of the comparison; and
prepare the device for shutdown; and
an impending shutdown alert controller coupled to the control circuit configured to output a perceptible alarm in response to the alert signal.

2. A welding-type system comprising:
an instant temperature determination unit;
a data processor in communication with the instant temperature determination unit;
memory in communication with the data processor and storing a thermal shutdown temperature value and a factory preset impending thermal shutdown temperature value;
a user input selection device configured to receive a second impending thermal shutdown temperature value; and
an impending shutdown alert signal generator in communication with the data processor;
a data processor in communication with the instant temperature determination unit and programmed to:
determine which of the factory preset impending shutdown temperature value or the second impending shutdown temperature value is lower;
cause the impending shut down alert signal generator to generate an impending shutdown alert signal when an instant temperature determined by the instant temperature determination unit at least is greater than the lower of the impending thermal shutdown temperature and the second impending shutdown temperature value.

3. The welding-type system of claim 2, wherein the data processor is programmed to cause the impending shutdown alert signal generator to generate an impending shutdown alert signal when an instant temperature determined by the instant temperature determination unit at least is equal to or greater than the lower of the impending thermal shutdown temperature and the second impending shutdown temperature value.

4. The welding-type system of claim 2, wherein the alert signal is a modulated signal.

5. The welding-type system of claim 2, wherein the alert signal is an analog signal.

6. The welding-type system of claim 2, wherein the alert signal is a digital signal.

7. The welding-type system of claim 2, comprising one or more alerts driven by the alert signal, the alerts including one or more of a motor, a light, an audible alert, and a vibration unit.

8. The welding-type system of claim 2, comprising two or more alert signal generators.

9. The welding-type system of claim 2, comprising two or more alerts driven by the two or more alert signal generators, respectively, the alerts including one or more of a motor, a light, an audible alert, and a vibration unit.

10. The welding-type system of claim 2, wherein the memory includes a shutdown routine that is invoked by the data processor when the electrical circuit, component, or device, reaches the impending shutdown temperature value.

11. The welding-type system of claim 2, wherein the welding-type system is a welding system.

12. The welding-type system of claim 2, wherein the welding-type system is a cladding system.

13. The welding-type system of claim 2, wherein the welding-type system is an electrical generator.

14. The welding-type system of claim 2, wherein the temperature determination unit includes a thermister or a thermostat.

15. A welding-type system comprising a controller board including a processor programmed to:
   receive a user-selected over temperature value;
   define an over temperature condition based on comparing the user-selected over temperature value to a factory-preset over temperature value;
   monitor for the over temperature condition of an apparatus;
   invoke a thermal shut down routine when the over temperature condition occurs;
   place the system in an error state; and
   maintain the system in the error state until the over temperature condition is cleared.

16. The welding-type system of claim 15, wherein the welding-type system is a plasma cutting system, and the thermal shutdown routine includes maintaining a flow of gas in a torch head.

17. The welding-type system of claim 15, wherein the welding-type system is a welding-system and the thermal shutdown routine includes shutting down weld current.

18. The welding-type system of claim 15, wherein the processor is programmed to maintain the apparatus in a stand by mode until triggered to operate by a user.

19. The welding-type system of claim 15, wherein the processor is programmed to prevent operation of the apparatus until the over temperature condition is cleared.

* * * * *